Dec. 17, 1929.  T. KAMEI ET AL  1,740,022
TERRESTRIAL GLOBE
Filed Jan. 18, 1928

INVENTORS:
T. Kamei & F. Kuwata
BY
Marks & Clerk
ATTORNEYS.

Patented Dec. 17, 1929

1,740,022

UNITED STATES PATENT OFFICE

TORAO KAMEI, OF TOKYO-SHI, AND FUKUTARO KUWATA, OF TOKYO-FU, JAPAN

TERRESTRIAL GLOBE

Application filed January 18, 1928. Serial No. 247,716.

This invention relates to improvements in terrestrial globes, more particularly to folding terrestrial globes.

One object of the invention is to provide a terrestrial globe foldable when not in use, so that it is readily portable.

Another object of the invention is to provide a terrestrial globe of such construction that it may be readily collapsed and carried in the pockets of schools boys and thus serves as a means of entertainment and education.

The accompanying drawings illustrate the embodiment of the invention, in which.

Figure 1:
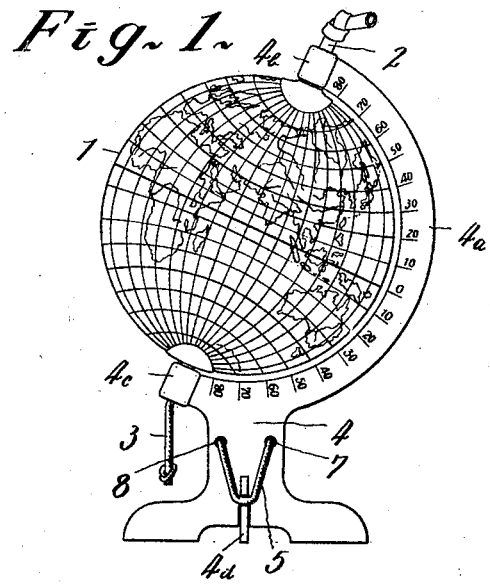
Fig. 1 is a front view.

Referring to the drawings in detail, 1 represents a globe, which is made of glassy silk (habutai) with rubber coating on the back and the printed figure of the globe on the surface, so that it can be folded when not in use and inflated by blowing the breath into it when in use.

The globe is provided with a rubber tube 2 of suitable length attached to its top, which is adapted to serve as an upper axis of the globe and as a means of inflating the globe. The tube is closed when the globe is inflated by tying its end in a knot and a rubber cord 3 of suitable length attached to the globe bottom in alinement with said rubber tube serves as a lower axis for the globe and a cord for turning the globe on its standard.

4 represents a standard with an arcuate holding arm $4_a$ having alining bosses $4_b$ and $4_c$ disposed at the same inclination as the earth's axis, in which the globe is mounted at its axes by the rubber tube 2 and the rubber cord 3.

Figure 2:
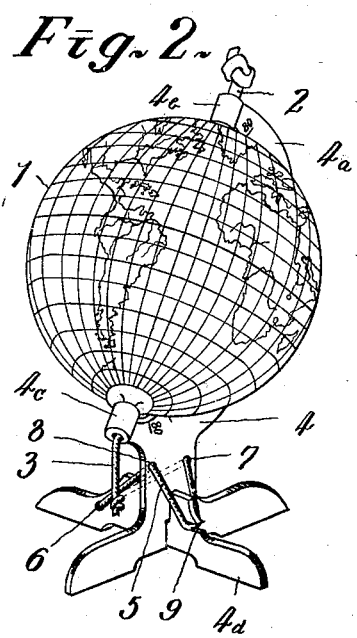
Fig. 2 is a perspective view.
Figure 3:
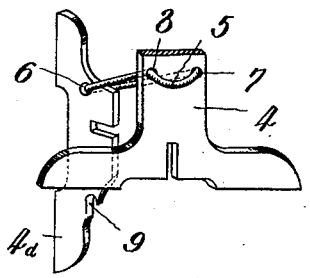
Fig. 3 is a fragmental perspective view of a base of a standard for a globe, one base member being detached.

Said standard is preferably made of a thin plate of suitable material, such as metal, celluloid or fibre and its holding arm $4_a$ is graduated with degrees of latitude. $4_d$ represents a cross member of a crossed base of the standard, which is detachable and held in position, when in use, by means of halving joint and an endless rubber cord 5. Said endless rubber cord is extended through the hole 6 provided adjacent one end of the cross member $4_d$ and the holes 7 and 8 provided on the standard 4, and when said cross member is positioned as in Fig. 2, the endless rubber cord 3 is stretched and engaged in a notch 9 provided in the cross member at the end opposite the hole 6 so that the cross member is securely held in position by tension of the endless rubber cord in addition to the halving joint.

Having now particularly described and ascertained the nature of our said invention and in what manner the same is to be performed, we declare that what we claim is:

In a folding terrestrial globe, an endless rubber cord, a standard for a globe made of suitable material, such as metal, celluloid or fibre, and having an arched globe holding arm and a base constituted by cross members, one of the cross members being detachable and held in position, when in use, by means of halving joint and the endless rubber cord.

In testimony whereof we affix our signatures.

TORAO KAMEI.
FUKUTARO KUWATA.